(12) United States Patent
Gao

(10) Patent No.: US 8,228,027 B2
(45) Date of Patent: Jul. 24, 2012

(54) WIRELESS POWER TRANSMITTER WITH MULTILAYER PRINTED CIRCUIT

(75) Inventor: Qiang Gao, Tucson, AZ (US)

(73) Assignee: Multi-Fineline Electronix, Inc., Anaheim, CA (US)

( * ) Notice: Subject to any disclaimer, the term of this patent is extended or adjusted under 35 U.S.C. 154(b) by 319 days.

(21) Appl. No.: 12/578,491

(22) Filed: Oct. 13, 2009

(65) Prior Publication Data

US 2011/0084656 A1   Apr. 14, 2011

(51) Int. Cl.
*H02J 7/00* (2006.01)
(52) U.S. Cl. ............................................. 320/108
(58) Field of Classification Search ................ 320/108
See application file for complete search history.

(56) References Cited

U.S. PATENT DOCUMENTS

| | | | |
|---|---|---|---|
| 4,293,812 A * | 10/1981 | Kubach et al. ................ | 323/272 |
| 5,027,709 A | 7/1991 | Slagle | |
| 5,923,544 A | 7/1999 | Urano | |
| 5,994,788 A | 11/1999 | Dobler et al. | |
| 6,028,413 A | 2/2000 | Brockmann | |
| 6,070,317 A * | 6/2000 | Allen et al. ..................... | 29/609 |
| 6,100,663 A | 8/2000 | Boys et al. | |
| 6,118,249 A | 9/2000 | Brockmann et al. | |
| 6,160,374 A | 12/2000 | Hayes et al. | |
| 6,246,592 B1 * | 6/2001 | Balogh et al. .................. | 363/16 |
| 6,316,909 B1 | 11/2001 | Honda et al. | |
| 6,320,766 B1 | 11/2001 | Park | |
| 6,597,159 B2 | 7/2003 | Yang | |
| 6,661,679 B1 | 12/2003 | Yang et al. | |
| 6,768,657 B1 | 7/2004 | Yang et al. | |
| 6,781,357 B2 * | 8/2004 | Balakrishnan et al. ....... | 323/282 |
| 6,906,495 B2 | 6/2005 | Cheng et al. | |
| 6,914,789 B2 * | 7/2005 | Kinoshita et al. .......... | 363/21.12 |
| 7,151,357 B2 | 12/2006 | Xian et al. | |
| 2001/0040458 A1 * | 11/2001 | Macbeth et al. .............. | 324/536 |
| 2008/0116847 A1 | 5/2008 | Loke et al. | |
| 2009/0028273 A1 | 1/2009 | Lin et al. | |
| 2009/0102292 A1 | 4/2009 | Cook et al. | |
| 2009/0102590 A1 | 4/2009 | Rhodes et al. | |
| 2009/0167449 A1 | 7/2009 | Cook et al. | |
| 2009/0174263 A1 | 7/2009 | Baarman et al. | |

* cited by examiner

*Primary Examiner* — Arun Williams
(74) *Attorney, Agent, or Firm* — Knobbe, Martens, Olson & Bear, LLP

(57) ABSTRACT

A wireless transmission system having a transmitter and receiver is described. In one embodiment, the transmitter includes an electronically-controlled switch controlled by a first pulse width modulation control circuit, the switch configured to pull current through a first inductor when the switch is closed, the first pulse width modulation control circuit outputting a PWM output signal to control the switch. A first feedback signal obtained from a control input of the switch. A second feedback signal obtained from a terminal of the inductor, wherein a control feedback signal is computed, at least in part, as a difference between the first feedback signal and the second feedback signal is provided to the first pulse width modulation control circuit. In one embodiment, the receiver includes a second pulse with modulation controller, the second pulse width modulation controller controlling the receiver switch to deliver a desired power from the receiving coil to a load.

23 Claims, 10 Drawing Sheets

WIRELESS POWER TRANSMITTER WITH MULTILAYER PRINTED CIRCUIT

BACKGROUND

1. Field of the Invention

The present invention relates to systems and methods for transferring power wirelessly from a sending device to a receiving device.

2. Background

The applications of wireless transfer to charge batteries of cell phones and other portable electronics devices are still emerging technology. The current technologies have several drawbacks. First the maximum efficiency of the existing inductive power transfer technology is significantly lower than those of wired regulators. Second, the wireless power transfer inherently has larger load range requirements since the coupling conditions can vary significantly. Thus progress needs to be made in two areas for its successful commercialization: 1) High efficiency. Energy transfer efficiency has to be reasonably close to wired power transfer and potentially has to meet Energy Star standard, which means the efficiency has to be above 80% over entire range of operational loading conditions, 2) Noise issue. The High energy levels needed for wireless power transfer and the low efficiency together create a strong noise for the electronics inside the phone, which can make the phone's wireless communication non-functional during charging.

SUMMARY

These and other problems are solved by a system that includes a transmitter with a feedback loop for efficient switching of a MOSFET or other electronic switch in a switched amplifier/oscillator. In one embodiment, the MOSFET gate and drain voltage is used to tune the switching frequency and duty cycle to ensure Class-E/zero voltage switching operation transmitter.

In one embodiment, a push-pull coupled transmitter planar coil pair and a planar receiving coil that can be embedded into a thin PCB/FPC are used. This wireless power transfer construction allows highly efficient coupling between transmitter and receiver, and relatively insensitive to the environment. It also effectively provides a shielding for the electronics which are adjacent to the receiving coil in the real applications.

One embodiment includes a bi-directional data channel. The data channel includes: 1) sensing instantaneous voltage on the transmitter coil sensing on the transmitter side (this voltage varies with the switching on the receiving side because of the magnetic coupling is bi-directional, and 2) Dual (frequency) series LC resonance sensing on the receiver side.

One embodiment includes an efficient power transmitter having an electronically-controlled switch controlled by a first pulse width modulation control circuit, the switch configured to pull current through a first inductor when the switch is closed, the first pulse width modulation control circuit outputting a PWM output signal to control the switch, a first feedback signal obtained from a control input of the switch, and a second feedback signal obtained from a terminal of the inductor, wherein a control feedback signal is computed, at least in part, as a difference between the first feedback signal and the second feedback signal is provided to the first pulse width modulation control circuit, the control circuit adjusting a frequency of the PWM output signal, at least in part, in response to the control feedback.

In one embodiment, the transmitter of the electronically-controlled switch includes a MOSFET. In one embodiment, the transmitter includes an electronically-controlled delay line controlling a time delay of the control. In one embodiment, an output of the transmitter is provided to a transmitting coil. In one embodiment, the transmitter includes a filter that filters frequency components of voltages across the transmitting coil and provides a filtered signal to the first pulse width modulation control circuit.

One embodiment includes an efficient wireless transmission system having a transmitter that includes an electronically-controlled switch controlled by a first pulse width modulation control circuit, the switch configured to pull current through a first inductor when the switch is closed, the first pulse width modulation control circuit outputting a PWM output signal to control the switch, a first feedback signal obtained from a control input of the switch, a transmitting coil, a second feedback signal obtained from a terminal of the inductor, wherein a control feedback signal is computed, at least in part, as a difference between the first feedback signal and the second feedback signal is provided to the first pulse width modulation control circuit, the control circuit adjusting a frequency of the PWM output signal, at least in part, in response to the control feedback.

In one embodiment, a receiver includes a receiving coil provided to a receiver switch; and a second pulse with modulation controller, the second pulse width modulation controller controlling the receiver switch to deliver a desired power from the receiving coil to a load.

In one embodiment, the electronically-controlled switch includes a MOSFET. In one embodiment, an electronically-controlled delay line controls a time delay of the control. In one embodiment, the receiver includes a filter that filters frequency components corresponding to a switching frequency of the second pulse width modulation controller provides a filtered signal to the first pulse width modulation control circuit.

In one embodiment, the transmitting coil includes a substantially flat conductor, the conductor comprising a series of holes/via spaced along a length of the conductor. In one embodiment, the receiving coil includes a substantially flat conductor, the conductor comprising a series of holes/via spaced along a length of the conductor.

DETAILED DESCRIPTION

Figure 1:
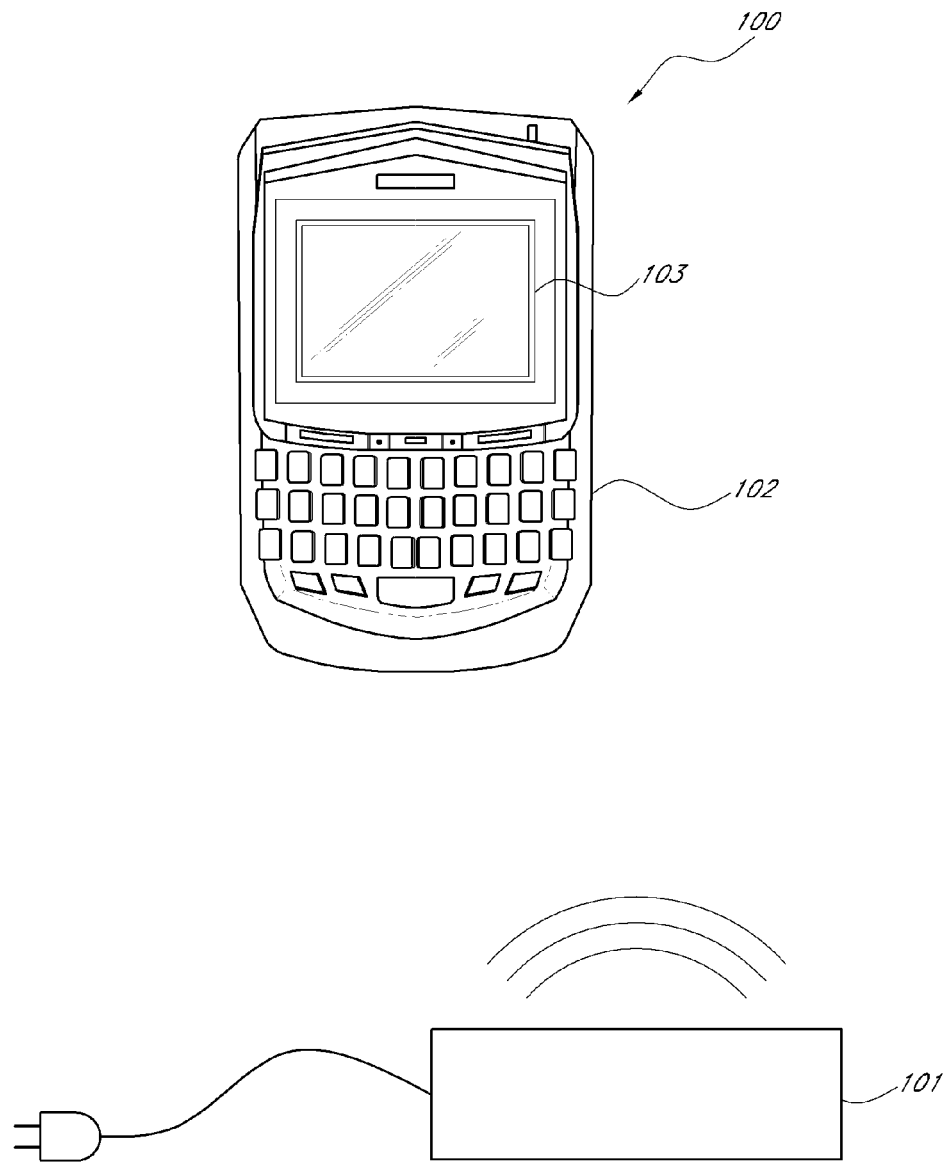
FIG. 1 shows a wireless power transfer system having power transmitter and a device with a power receiver.

FIG. 1 shows a wireless power transfer system 100 having a power transmitter 101 that transmits electromagnetic radiation and a device 102 with a receiving coil 103 that receives the electromagnetic radiation and provides the received power to a receiver circuit that powers the device 102 (or charges a battery in the device 102). The efficiency of wireless power transfer is determined by 1) the efficiency of the electronics in the transmitter 101 and 2) the receiver 103 and the inductive/wireless coupling through the air. The coupling between the transmitter 101 and the receiver changes with their distance and relative locations and the presence of metallic objects in the vicinity.

FIG. 2A shows a simple class-E amplifier 200 using a MOSFET 202. A first terminal of an inductor L1 203 is provided to the drain of the MOSFET 202. A second terminal of the inductor L1 203 is provided to a positive terminal of a DC power source 201. A negative terminal of the power source 201 is provided to ground. A source of the MOSFET 202 is provided to ground. A first terminal of a capacitor C1 204 is provided to the drain of the MOSFET 202 and a second terminal of the capacitor C1 204 is provided to ground. A first terminal of a capacitor C2 205 is provided to the drain of the MOSFET 202 and a second terminal of the capacitor C2 205 is provided to a first terminal of an inductor L2 206. A first terminal of a load resistor 207 is provided to a second terminal of the inductor L2 206 and a second terminal of the resistor 207 is provided to ground. A fixed oscillator/driver 210 drives a gate of the MOFET 202.

Figure 2:
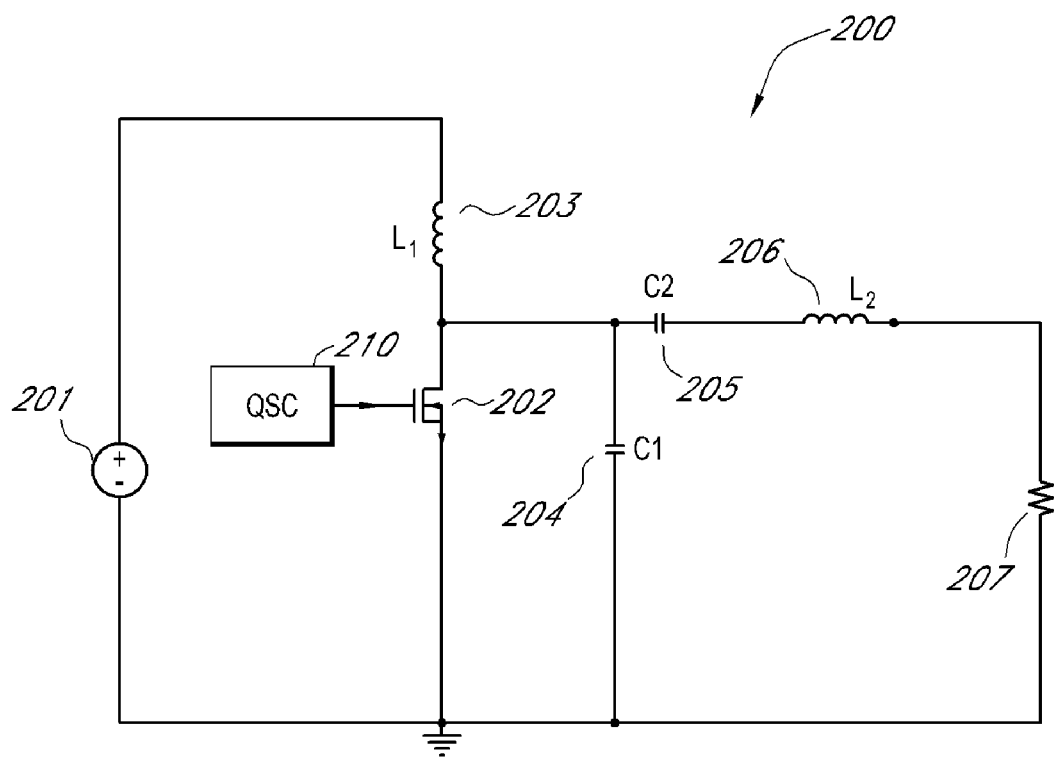
FIG. 2 shows a simple class-E amplifier.
Figure 2B:
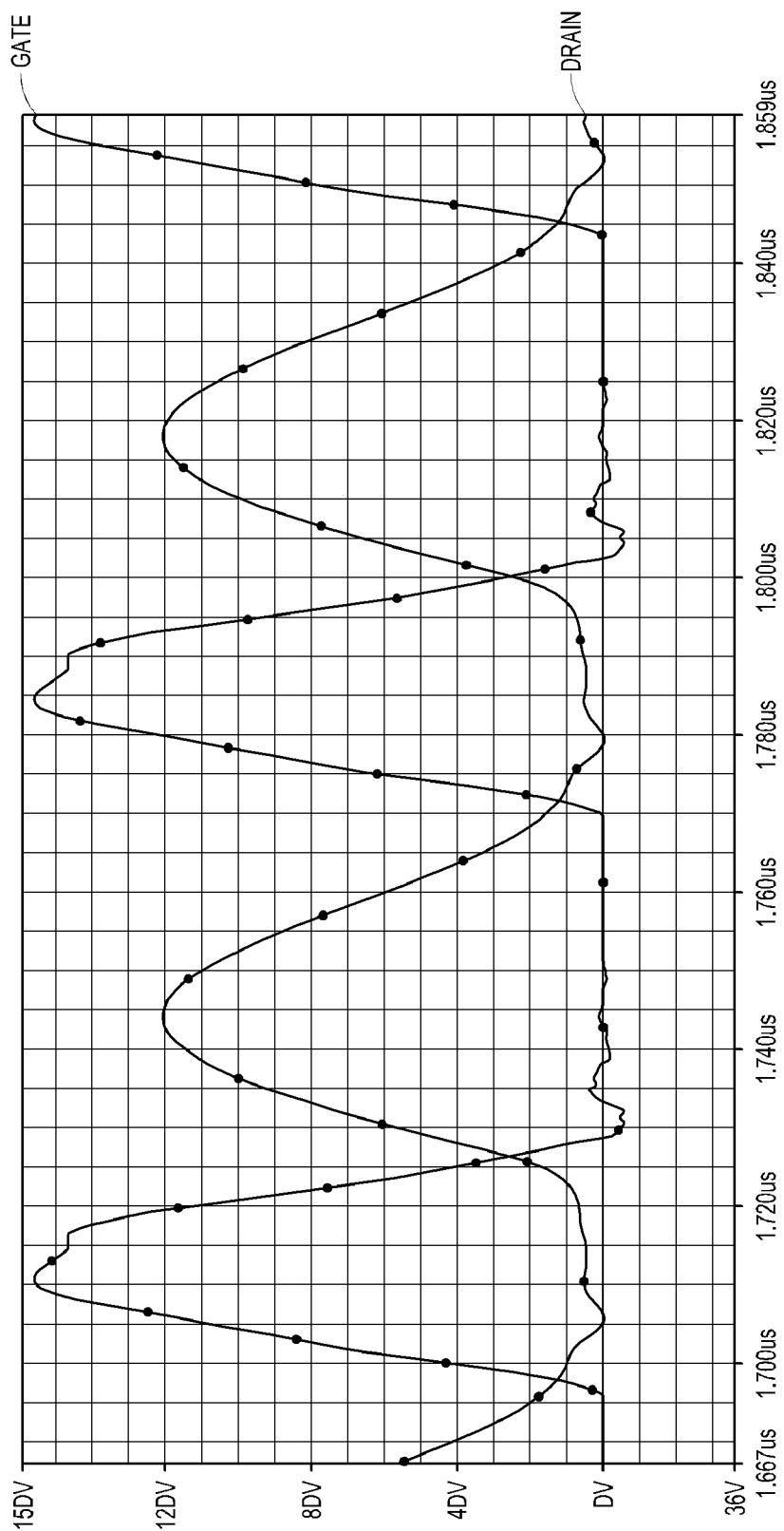
FIG. 2B shows the gate and drain voltage waveforms of the amplifier in FIG. 2A.

FIG. 2B shows the gate and drain voltage waveforms of the amplifier in FIG. 2A.

Class-E RF amplifier is a classical amplifier that provides relatively high efficiency when delivering power to a known fixed load. As shown in FIG. 2B, the gate voltage of the MOSFET 202 is substantially 180 degrees out of phase with respect to the drain voltage. This switching minimizes switching losses in the MOSFET 202 because the MOFET I is switched when drain source voltage is relatively small. The value of L1 203 and C1 204 depend on the load and switching frequency. In the conventional class E amplifiers, the load R 207 is fixed, and thus the switching frequency and duty cycle and the values of L1 203, C1 204, L2 205 and L2 206 can be chosen to provide maximum efficiency.

Unfortunately, in the wireless power applications, the coupling of through the air is a variable, and thus the amplifier 200 will not operate efficiently in this application.

Figure 3:
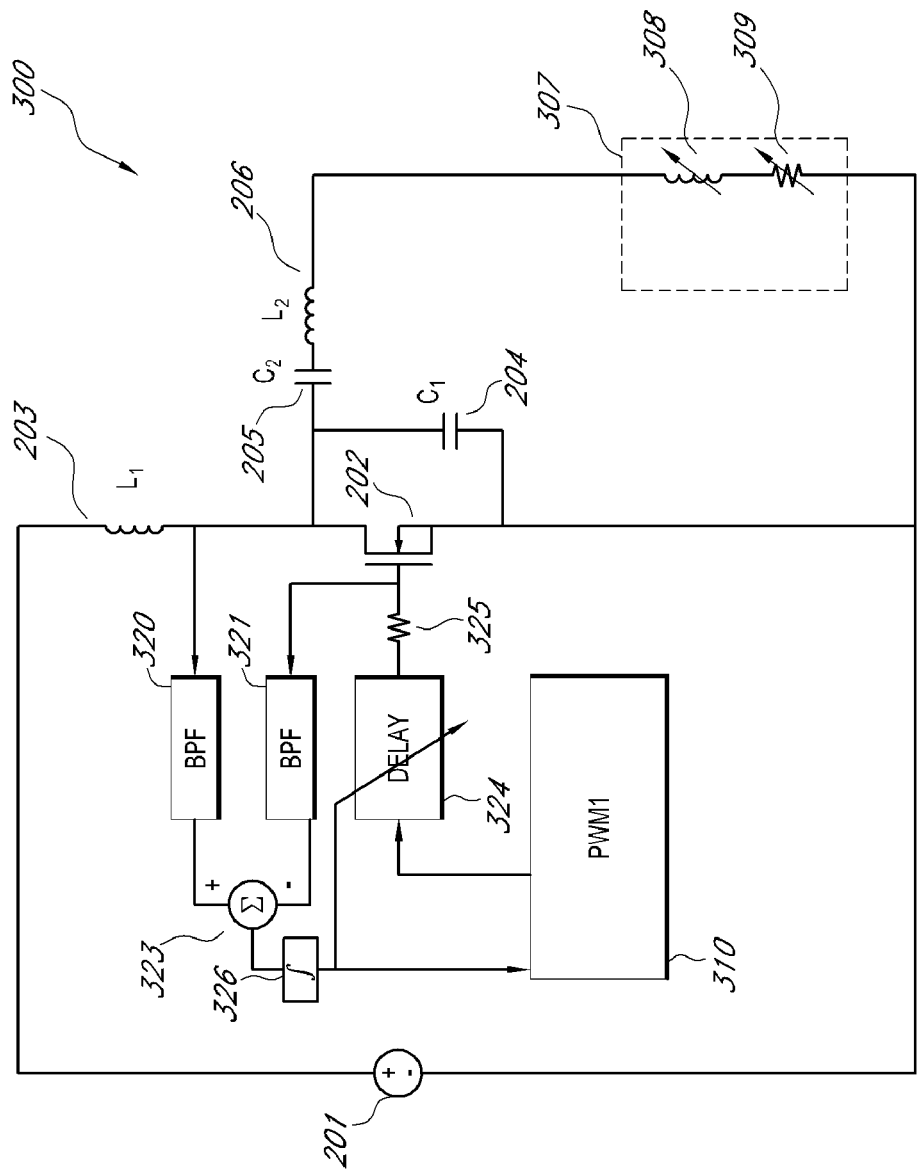
FIG. 3 shows an improved amplifier that operates efficiently with different load conditions.

FIG. 3 shows an improved amplifier 300 that operates efficiently with different load conditions. The amplifier 300 is similar to the amplifier 200 and includes the MOSFET 202, the inductor L1 203, the power source 201, the capacitor C1 204, the capacitor C2 205 and the inductor L2 206 as shown in FIG. 2. However, in the amplifier 300 the load 207 is replaced with a variable load 307. The load 307 includes a variable inductance L3 308 in series with a variable resistance 309. In the amplifier 300, the fixed oscillator driver 210 is omitted and the gate of the MOSFET 202 is driven by an output variable delay line 324 via a gate resistor 325. The drain of the MOSFET 202 is provided to an input of a bandpass filter 321 and an output of the bandpass filter 320 is provided to a non-inverting input of an adder 323. The gate of the MOSFET 202 is provided to an input of a bandpass filter 321 and an output of the bandpass filter 320 is provided to an inverting input of the adder 323. An output of the adder 323 is provided through an integrator 326 to a control input of a Pulse Width Modulator (PEM) 310, and an optional analog delay element 324 which delays the PWM signal from PWM controller 310 according to the output from 326. The delay function can be digitally implemented by PWM 310. Analog delay 324 can useful for operating when a low cost PWM controller has limited processing speed.

The resistance 309 includes resistive losses in the transmit coil, radiative losses, and losses due to power delivered to the receiver 103.

The amplifier 300 uses the feedback loop formed from the bandpass filter 320, the bandpass filter 321, the adder 323, the PWM 310 and the delay line 324 to control the switching of the MOSFET 202 to produce efficient operation in the presence of the varying load 307. It is not practical to directly sense the instantaneous load resistance 307, and the drain voltage and current waveform are noisy for non-ideal MOSFET and driver devices. Thus, the amplifier 300 uses feedback to adjust the frequency and/or duty cycle and/or timing of the gate drive to ensure high efficiency operation for large range of air distance between coils.

In the transmitter 300, the timing at the MOSFET 202 gate is controlled by the PWM 310 and the delay line 324. The output from the adder 323 is integrated fed back to control the delay line 324. When the voltage waveforms at MOSFET 202 gate and drain are approximately 180 degree out of phase, the output of adder 323 is maximized (because the gate voltage of the MOSFET 202 is inverted). The bandpass filters 320 and 321 have pass-band at the designed switch frequencies. These two filters remove the spurious signals due to the noise and parasitic capacitances of the MOSFET 202.

The output signal from adder 323 is feedback to control frequency and the timing of PWM signal for the exact turn-on and turn-off of the MOSFET gate. When the air distance between transmit and receive coil is varied, the inductance (206) will also change. This will change the resonance frequency of LC oscillator (205 and 206). However, the feedback loop will adjust PWM frequency and the delay of the turn-on and turn-off timing of the MOSFET gate accordingly, ensure that MOSFET is turned-off when the drain voltage is nonzero. This ability to digitally control the exact cycle-by-cycle timing of MOSFET gate voltage makes it possible to minimize the switching power loss in all loading conditions.

Figure 4:
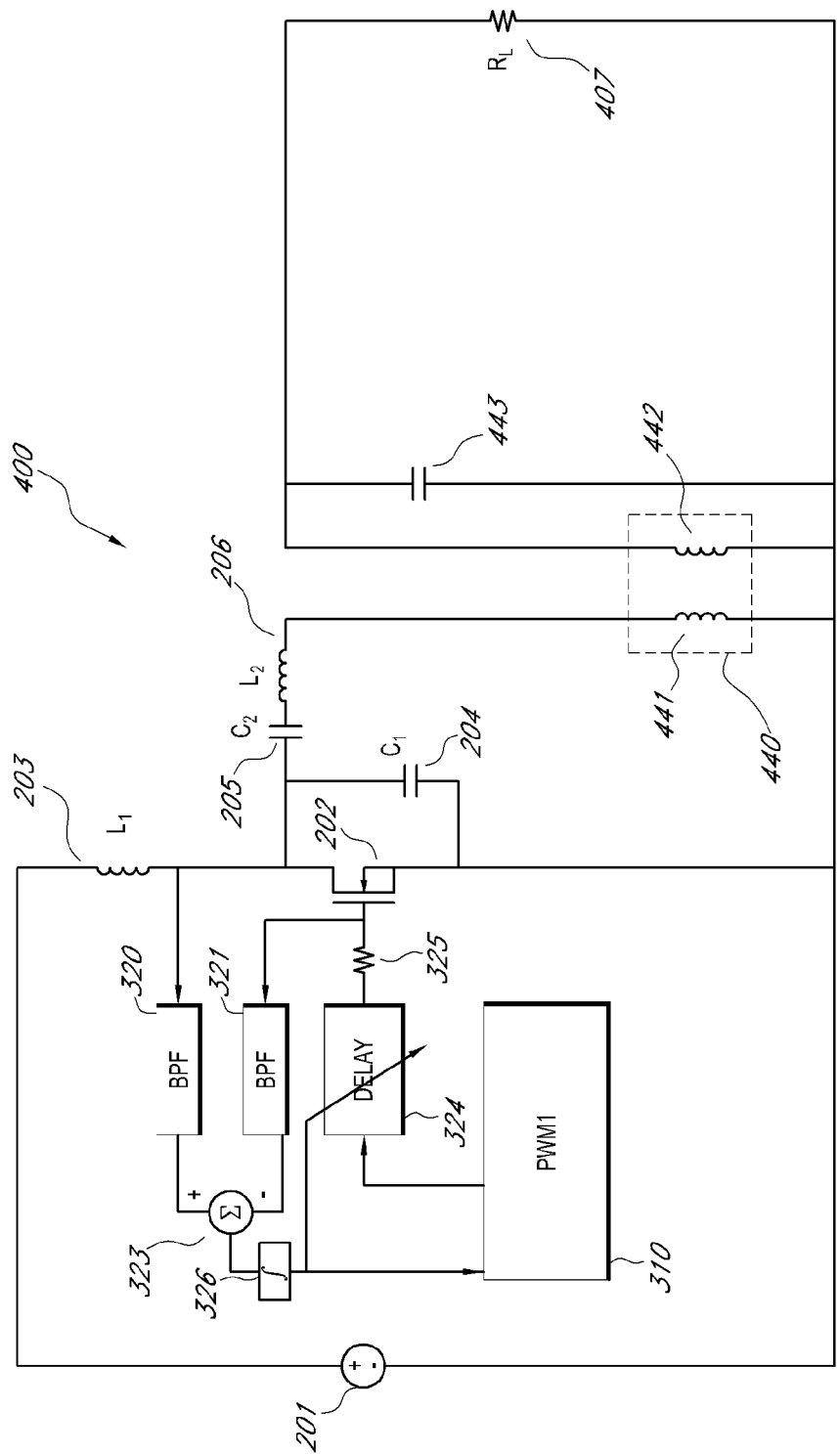
FIG. 4 shows the amplifier of FIG. 3 coupled to a passive receiving circuit.

FIG. 4 shows the amplifier of FIG. 3 coupled to a simple passive receiving circuit. In FIG. 4, the variable load 307 is replaced with a transmitting coil 441. The transmitting coil 441 is electromagnetically coupled to a receiving coil 442 in the receiver. A first terminal of the coil 441 is provided to a first terminal of a capacitor 443 and to a first terminal of a load resistor 407. A second terminal of the coil 442 is provided to a second terminal of the capacitor 443 and to a second terminal of the resistor 407.

Energy coupled from the coil 441 to the coil 442 is provided to the resistor 407. Thus, the resistor 407 appears as a load to the amplifier. Changes in the resistor, or changes in the separation between the coils 441 and 442 will change the impedance reflected back to the amplifier. These impedance changes will change the relationship between the gate and drain voltages of the MOSFET 202. The feedback loop formed from the bandpass filter 320, the bandpass filter 321, the adder 323, the PWM 310 and the delay line 324 will sense these changes in the gate and drain voltages and adjust the switching of the MOSFET 202 to produce efficient operation in the presence of the varying load.

Figure 5:
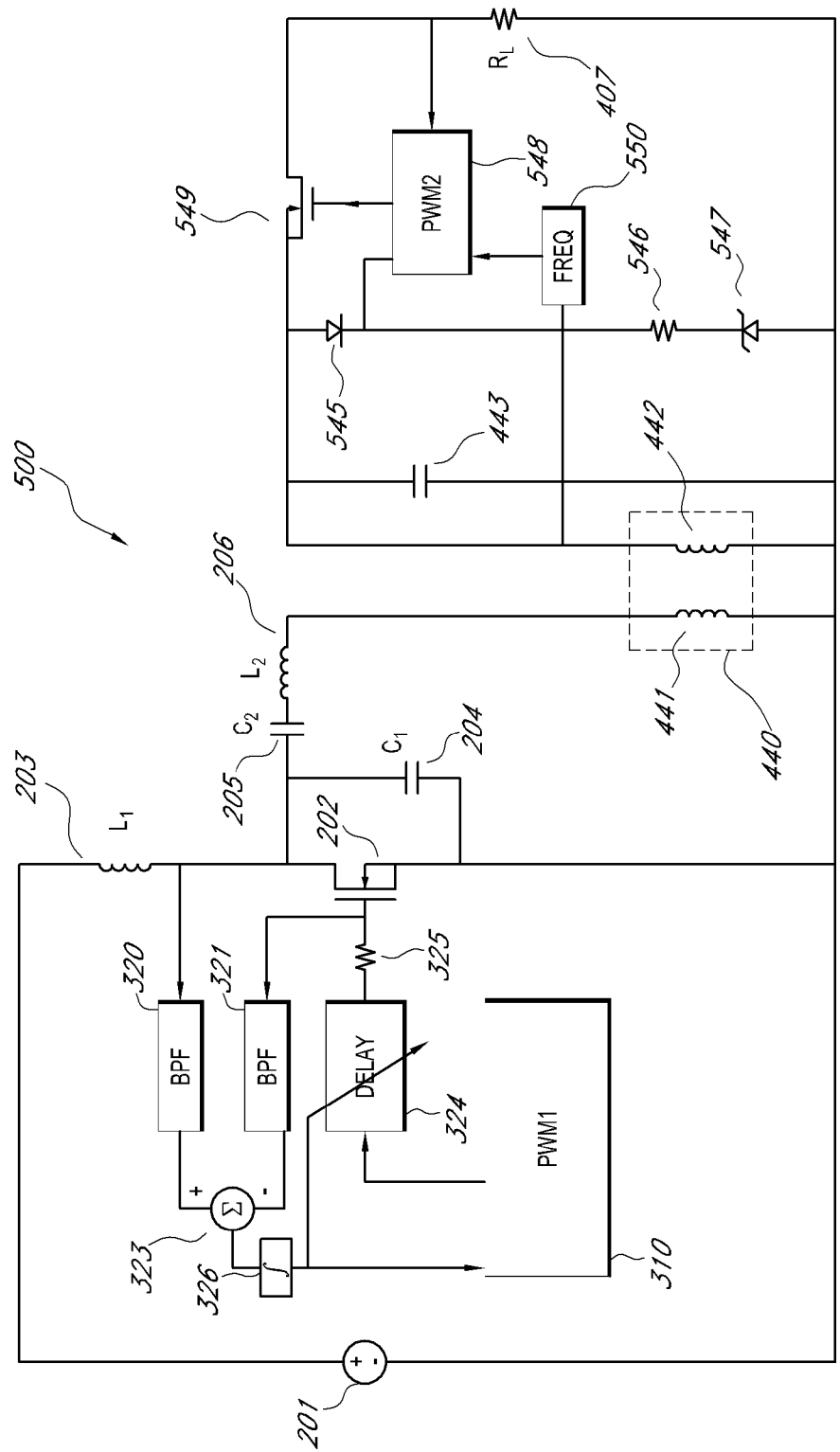
FIG. 5 shows the amplifier of FIG. 3 coupled to a switching receive circuit.

FIG. 5 shows the amplifier of FIG. 3 coupled to a switching receive circuit. In FIG. 5, the variable load 307 is replaced with a transmitting coil 441. The transmitting coil 441 is electromagnetically coupled to a receiving coil 442 in the receiver. A first terminal of the coil 441 is provided to a first terminal of a capacitor 443, to an anode of a diode 545 and to a source of a MOSFET switch 549. A second terminal of the coil 442 is provided to a second terminal of the capacitor 443, to an anode of a zener diode 547, and to the second terminal of the resistor 407. A drain of the MOSFET 549 is provided to the first terminal of the resistor 407. A cathode of the diode 545 is provided to a power input of a receiver PWM 548 and to a first terminal of a current-limiting resistor 546. A second terminal of the resistor 546 is provided to a cathode of the zener diode 547. A control output of the PWM 548 is provided to a gate of the MOSFET 549. The first terminal of the resistor 407 is provided to a voltage sense input of the PWM 548. Optionally, the first terminal of the coil 442 is provided to an input of a frequency-sensing filter 550 and an output of the frequency-sensing filter 550 is provided to an input of the PWM 548. In one embodiment, the filter 500 includes an LC filter.

The zener diode 547 is used to regulate supply voltage to the PWM controller 548 at start-up. The PWM controller 548 adjusts the switching frequency based on load conditions. The optional frequency-sensing filter 550 senses the switching frequency of the PWM 310 and provides the frequency information to the PWM controller 548.

The purpose of PWM controller 548 is to regulate the received energy into a DC current required for the load. The switching frequency is typically much lower frequency than PWM 310. In addition, this frequency is coded to varies with voltage and/or current desired by the load.

Figure 6:
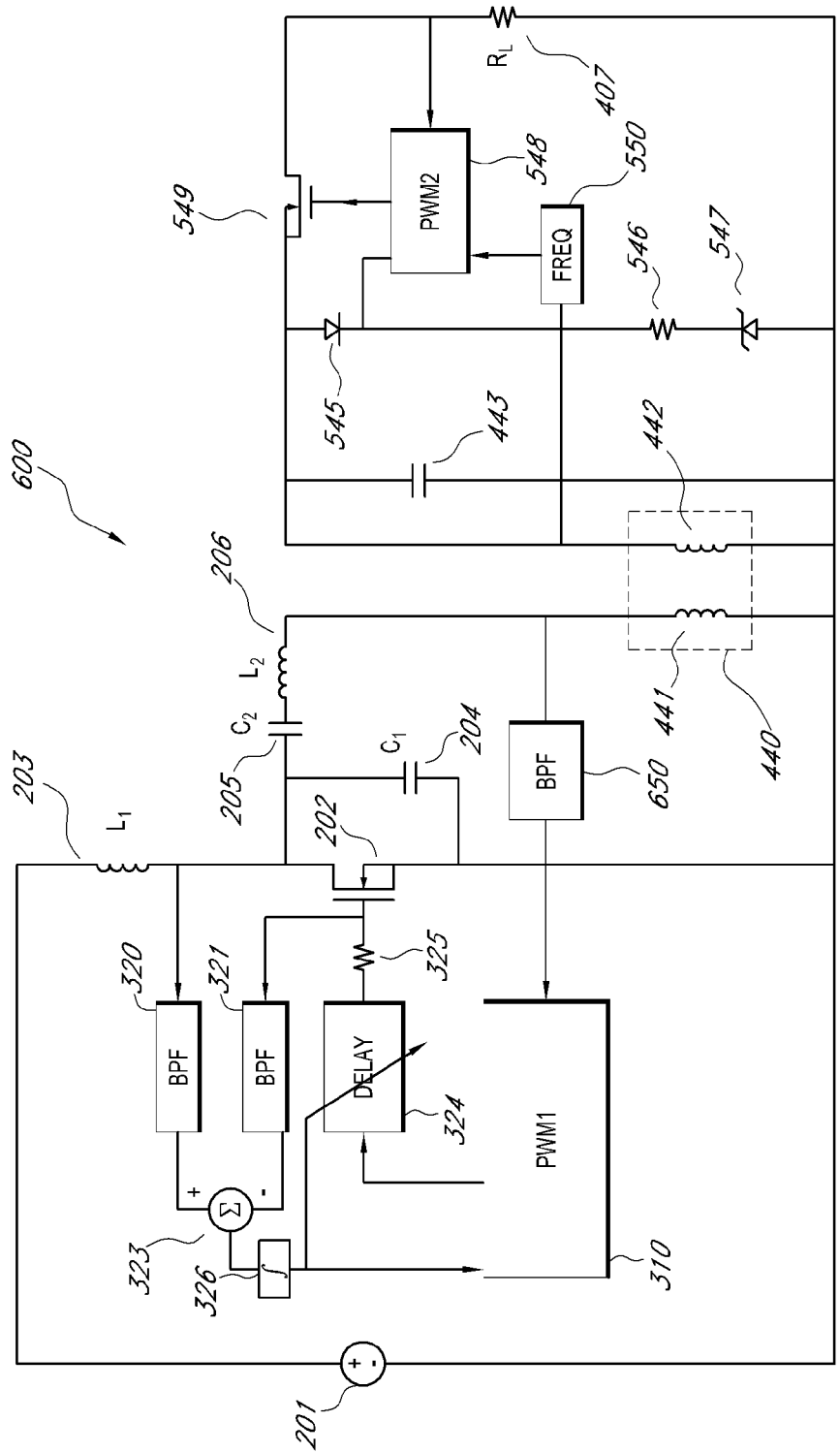
FIG. 6 shows the amplifier of FIG. 5 coupled to a switching receive circuit wherein the switching frequency of the receive circuit is sensed by the amplifier.

FIG. 6 shows the circuit of FIG. 5, with the addition of a bandpass filter 650 to provide frequency feedback from the receiver PWM 548 to the transmitter PWM 310. The first terminal of the coil 440 is provided to an input of the bandpass filter 650 and an output of the bandpass filter 650 is provided to an input of the PWM 310. Switching frequency components from the receiver are coupled back through the coils 441 and 442 from the receiver side to the transmitter side. The bandpass filter 650 is configured to attenuate frequency components generated by the switching of the MOSFET 202 and to pass frequency components corresponding to the switching of the MOSFET 549. Thus, the PWM 310 can sense the switching frequency of the PWM.

Figure 7:
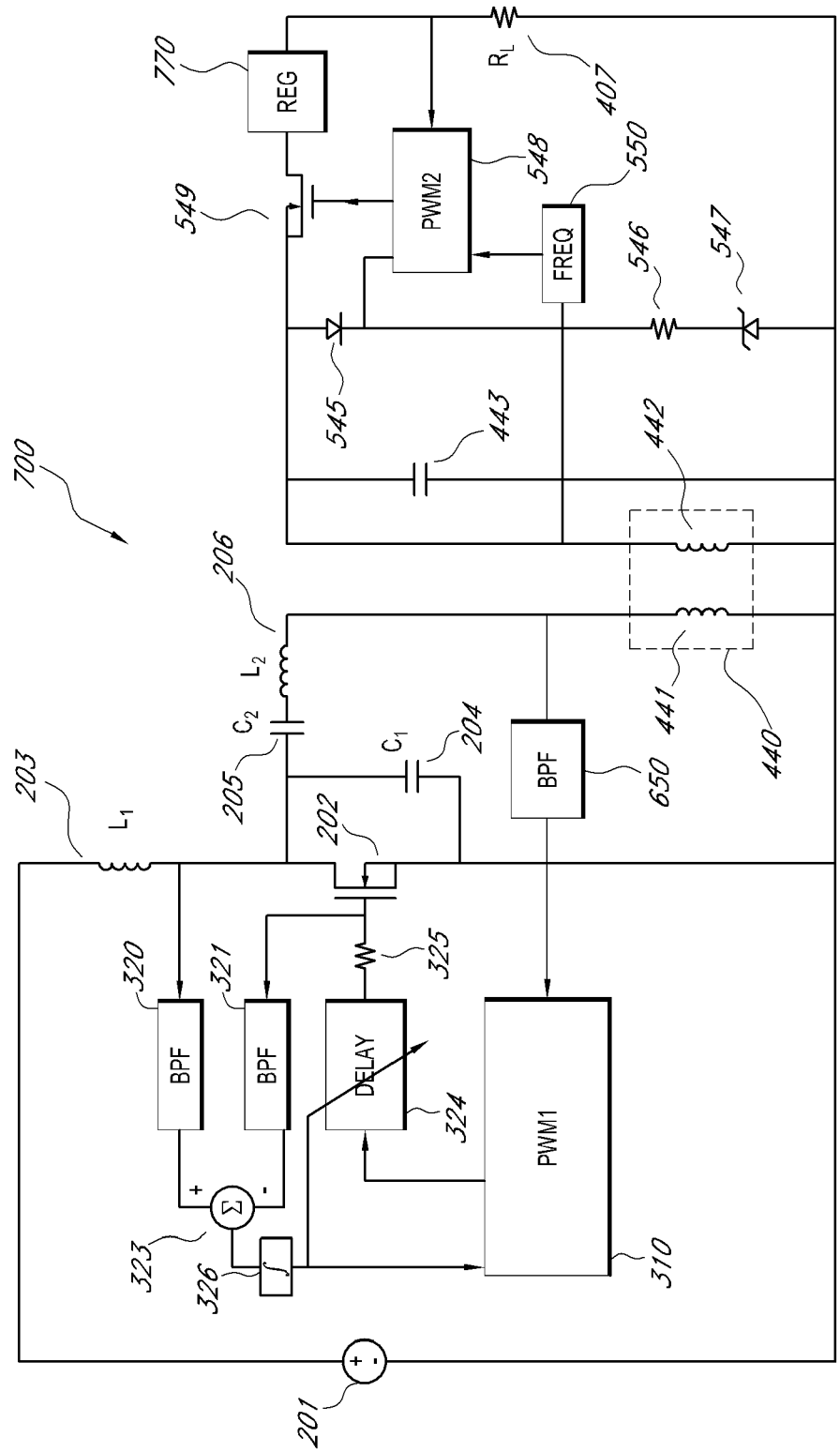
FIG. 7 shows the amplifier of FIG. 6 coupled to a switching receive circuit wherein the switching frequency of the receive circuit is sensed by the amplifier.

FIG. 7 shows the amplifier of FIG. 6 with the addition of a regulator 770 to control current and voltage to the load 407. The regulator 770 is provided in series between the drain of the MOSFET 549 and the first terminal of the resistor 407. In one embodiment, the regulator 770 is a battery charging regulator and the load 407 includes a battery being charged by the regulator 770.

For many batteries, including Li-Ion rechargeable batteries, two modes are typically used. In the first stage (CI) when the battery energy is low, a constant current is supplied to fast charge the battery. When the battery energy level reached a voltage threshold, this threshold voltage (CV) is maintained while a decreasing current is supplied to charge the battery to full capacity.

The CICV (constant current constant voltage) operation can be implemented by using the switching frequency as a feedback to transmitter side. When the MOSFET 549 is turned on, the energy stored in the LC tank circuit will be drained. This will be reflected back to the transmitter side as a higher impedance load. The switching frequency on the receiver side can thus be detected on the transmitter side via the bandpass filter 650. The transmitter PWM controller 310 adjusts the delay of the start time of next cycle to reduce the energy to be transferred.

Figure 8:
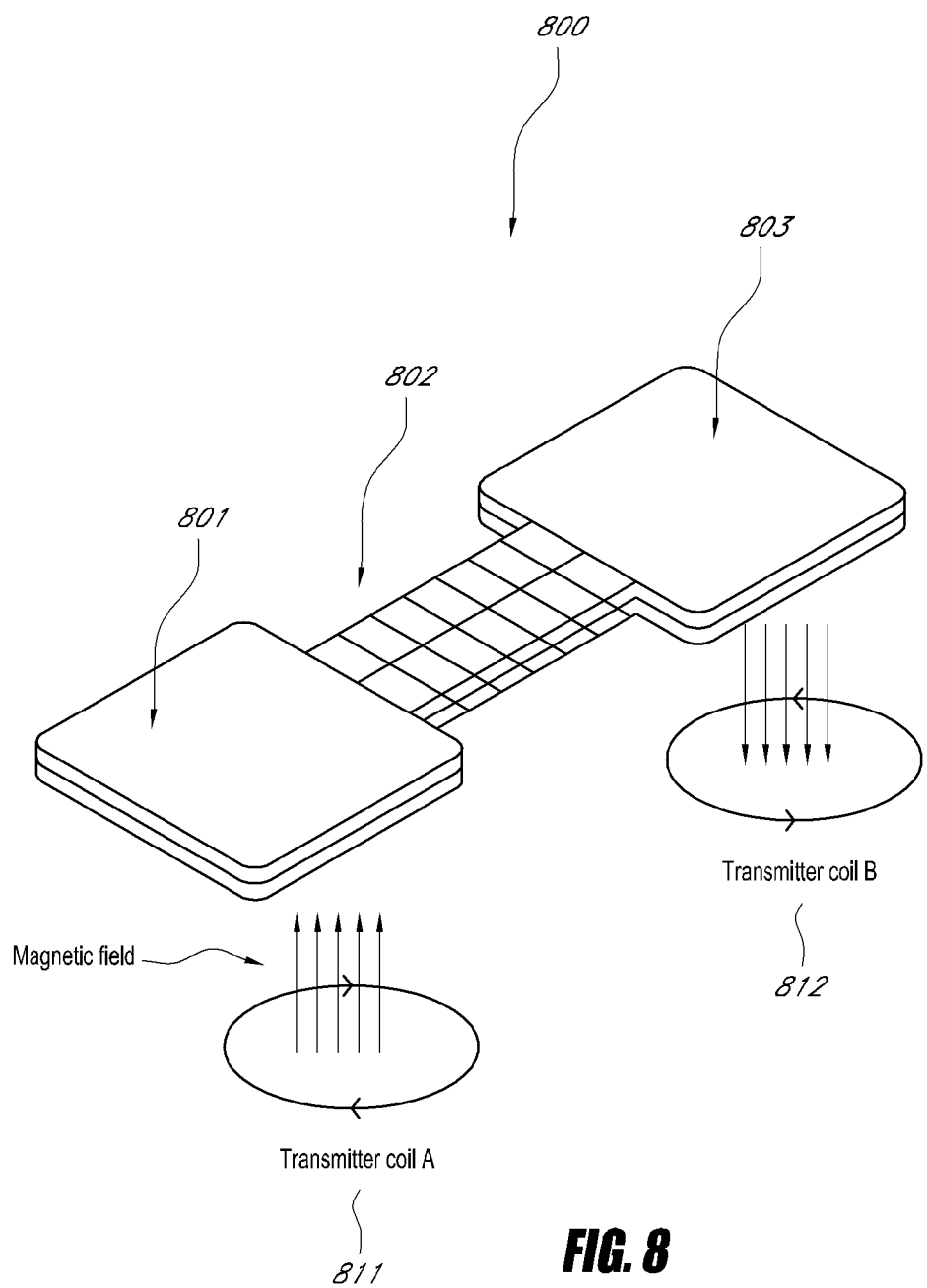
FIG. 8 shows one embodiment of a receive coil configured to couple to a pair of transmit coils.

FIG. 8 shows one embodiment of receive coil 442 configured to couple to a pair of transmit coils. In the system of FIG. 8, the transmitter coil 441 has been configured as two coils 811, 812 in series and wound 180 degrees out of phase with respect to one another. The receive coil 442 is wound on a portion of magnetic material provided between a first pad 801 and a second pad 803. The pads 801 and 803 are made of magnetic material and positioned to couple to the coils 811 and 812, respectively.

For the strong resonance coupling through the air, the receiver coil design is important. For cell phone and portable electronics applications, planar spiral inductors are typically used to capture magnetic flux.

Planar coils are typically in the form of a spiral. However, planar spirals are simply never used in conventional high efficiency power supplies. Spiral coils have poor efficiency because the inter-winding flux cancellation and the loss increases very rapidly as the number of turn increases. The air gap between windings cannot be too small as the proximity effects and intertwining capacitance work against the resonance. On the other hand, for efficient flux collection, number of turns need to be sufficient as required for the resonance inductance. One additional requirement for strong resonance is that coil must have as low AC impedance as possible.

For strong coupling, it is desirable to reduce inductance as much as possible for a given resonance resonant frequency. However, the flux collected by a given coil is proportional to the surface area, which increases with inductance. This leads to the following design for much more efficient coupling:

The push-pull action of the transmitter functions as a source/drain for magnetic flux. The dipole magnetic flux concentrator minimizes the energy loss to the stray magnetic flux in the typical spiral coils.

This topology allows reduced inductance without reducing the flux receiving area, and maximizes the coupling efficiency by providing a closed circuit path for magnetic flux (as the two transmitter coils have different polarities). The receiving structure acts as a flux concentrator to minimize the coupling loss. The flux concentrators can be combined as a single piece and goes through the receiving coil. This will increase the inductance of the receiving coil. As a result, the maximum energy transferred will be reduced but the coupling efficiency will not be reduced.

Figure 9:
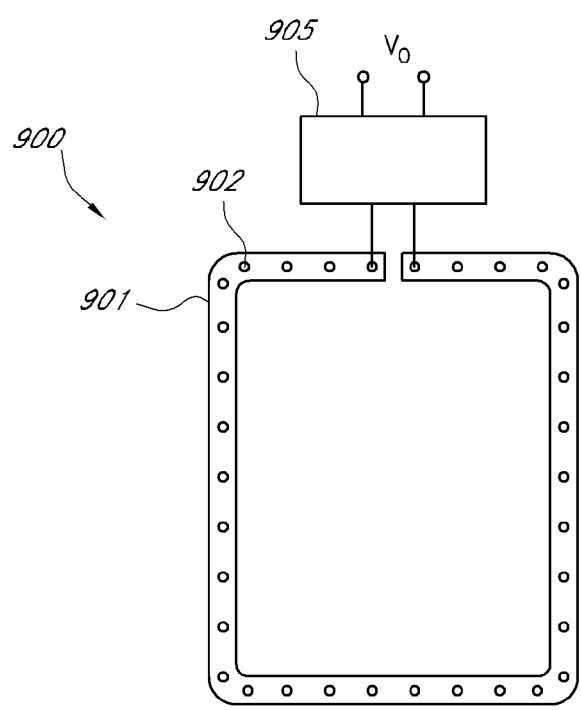
FIG. 9 shows an improved coupling coil that includes impedance matching holes.

The transmitter 101 generates energy at a desired frequency to provide coupling between the transmitter 101 and receiver 103. In order to limit the size of transmit and receive coils which is required for portable electronics, it is advantageous to use a relatively high frequency. As frequency increases, the current flows on the surface of conductor, i.e., the skin effect. The copper skin depth is 210 um at 100 khz, 66 um at 1 Mhz and 21 um at 10 Mhz. The copper thickness of standard 1 oz PCB/FPC is 34 um, and ½ oz is 18 um. This means that standard PCB/FPC process are good for 10 MHz range of operation because it minimizes AC impedance of the conductor, and allows the maximum resonance. Unlike the previous arts which uses Litz wire to minimize the impedance of coil, an improved planar PCB coil is disclosed below:

FIG. 9 shows an improved coupling coil 900 that includes impedance matching holes (or Via) 902. The coil 900 is configured as a loop of multilayer substantially flat conductive material, and the holes/Via 902 are disposed along the length of the conductor to connect the conductors on the different layers. The two ends of the conductor 901 are provided to a receiver circuit 905. In this arrangement, the coil 900 is an embodiment of the coil 442. One of ordinary skill in the art will recognize that the coil 900 can be used as an embodiment of the transmitting coil 441. The conductor width, spacing between holes/Via 902 and the distance between conductors between layers are chosen to minimize the skin effect loss and proximity effect loss of the coil 900. This allows the coil to be tuned to provide maximum efficiency over a desired frequency band.

Although the above-disclosed embodiments have shown, described, and pointed out the fundamental novel features of the invention as applied to the above-disclosed embodiments, it should be understood that various omissions, substitutions, and changes in the form of the detail of the devices, systems, and/or methods shown can be made by those skilled in the art without departing from the scope of the invention. For example, although the above specification describes MOFETS 202 and 549, one of ordinary skill in the art will recognize that the MOSFETS 202 and 549 are merely examples of electronically-controlled switches and other electronically-controlled switches can be used, such as, for example, FETS, transistors, etc. Moreover, various portions of the circuits shown in FIGS. 3-7 can be implemented in hardware and/or in combinations of hardware and software. Consequently, the scope of the invention should not be limited to the foregoing description, but should be defined by the appended claims.

What is claimed is:

1. An efficient power transmitter, comprising:
   an electronically-controlled switch controlled by a first pulse width modulation control circuit, said switch configured to pull current through a first inductor when said switch is closed, said first pulse width modulation control circuit outputting a PWM output signal to control said switch;
   a transmitting coil comprising a multilayer printed circuit disposed on a non-conductive substrate, wherein vias are disposed along a length of said transmitting coil to connect conductors on different layers, and wherein said vias are configured to reduce skin effect losses and proximity effect losses when said power transmitter is used to wirelessly transmit electric power to a receiver;
   a first feedback signal obtained from a control input of said switch; and
   a second feedback signal obtained from a terminal of said inductor, wherein a control feedback signal is determined, at least in part, as a difference between said first feedback signal and said second feedback signal is provided to said first pulse width modulation control circuit, said control circuit adjusting a frequency of said PWM output signal, at least in part, in response to said control feedback.

2. The transmitter of claim 1, wherein said electronically-controlled switch comprises a MOSFET.

3. The transmitter of claim 1, further comprising an electronically-controlled delay line, said electronically-controlled delay line controlling a time delay of said control.

4. The transmitter of claim 1, wherein an output of said transmitter is provided to a transmitting coil.

5. The transmitter of claim 4, further comprising a filter that filters frequency components of voltages across said transmitting coil and provides a filtered signal to said first pulse width modulation control circuit.

6. An efficient wireless transmission system, comprising:
   a transmitter, comprising:
      an electronically-controlled switch controlled by a first pulse width modulation control circuit, said switch configured to pull current through a first inductor when said switch is closed, said first pulse width modulation control circuit outputting a PWM output signal to control said switch;
      a first feedback signal obtained from a control input of said switch;
      a transmitting coil comprising a multilayer printed circuit disposed on a non-conductive substrate, wherein vias are disposed along a length of said transmitting coil to connect conductors on different layers, and wherein said vias are configured to reduce skin effect losses and proximity effect losses when said transmitting coil is used to wirelessly transmit electric power to a receiver;
      a second feedback signal obtained from a terminal of said inductor, wherein a control feedback signal is determined, at least in part, as a difference between said first feedback signal and said second feedback signal is provided to said first pulse width modulation control circuit, said control circuit adjusting a frequency of said PWM output signal, at least in part, in response to said control feedback; and
   a receiver, comprising:
      a receiving coil provided to a receiver switch; and
      a second pulse with modulation controller, said second pulse width modulation controller controlling said receiver switch to deliver a desired power from said receiving coil to a load.

7. The system of claim 6, wherein said electronically-controlled switch comprises a MOSFET.

8. The system of claim 6, further comprising an electronically-controlled delay line, said electronically-controlled delay line controlling a time delay of said control.

9. The transmitter of claim 6, further comprising a filter that filters frequency components corresponding to a switching frequency of said second pulse width modulation controller provides a filtered signal to said first pulse width modulation control circuit.

10. The system of claim 6, wherein said transmitting coil comprises a substantially flat conductor.

11. The system of claim 6, wherein said receiving coil comprises a substantially flat conductor said conductor comprising a series of holes/via spaced along a length of said conductor.

12. The transmitter of claim 1, wherein said frequency of said PMW output signal is greater than or equal to about 1 MHz.

13. The transmitter of claim 12, wherein said transmitting coil is configured to be operated at about 10 MHz.

14. The transmitter of claim 1, wherein said non-conductive substrate comprises a circuit board.

15. The transmitter of claim 1, wherein said non-conductive substrate comprises a flexible substrate.

16. The system of claim 6, wherein said transmitting coil comprises a conductor having a thickness less than or equal to about 66 μm.

17. The system of claim 16, wherein said transmitting coil comprises a conductor having a thickness less than or equal to about 34 μm.

18. The system of claim 6, wherein said frequency of said PWM output signal is within about a 10 MHz range of operation.

19. The system of claim 6, wherein said vias are configured to increase resonance coupling between said transmitting coil and said receiving coil.

20. The system of claim 6, wherein said vias are configured to reduce AC impedance of said transmitting coil.

21. The system of claim 6, wherein said transmitting coil does not include Litz wire.

22. A method of manufacturing a wireless electric power transmitter having a printed circuit transmitting coil, the method comprising:

forming a transmitting coil by:
providing a printed circuit board having a plurality of copper layers disposed on different layers of a non-conductive substrate, wherein a thickness of each, of the plurality of copper layers is less than or equal to about 34 µm;
forming a conductive loop using at least one of the plurality of copper layers; and
creating a plurality of vias disposed along a length of the conductive loop, wherein the plurality of vias are configured to electrically connect conductors on the different layers, and wherein the electrical connections between different layers are configured to provide impedance matching;

operatively connecting an electronically-controlled switch to the transmitting coil, wherein the electronically-controlled switch is configured to direct current through the transmitting coil when the switch is closed; and operatively connecting a pulse width modulation control circuit to control the electronically-controlled switch, wherein the pulse width modulation control circuit is configured to operate the transmitting coil at frequencies selected to produce strong resonance coupling between the transmitting coil and a receiving coil, and wherein the frequencies are selected at least in part based on a distance between the transmitting coil and the receiving coil.

23. The method of claim 22, wherein the printed circuit board is a flexible printed circuit.

\* \* \* \* \*

UNITED STATES PATENT AND TRADEMARK OFFICE
CERTIFICATE OF CORRECTION

| | | |
|---|---|---|
| PATENT NO. | : 8,228,027 B2 | Page 1 of 1 |
| APPLICATION NO. | : 12/578491 | |
| DATED | : July 24, 2012 | |
| INVENTOR(S) | : Qiang Gao | |

It is certified that error appears in the above-identified patent and that said Letters Patent is hereby corrected as shown below:

On the Title Page (Item 57) Abstract line 15, Change "with" to --width--.

In the Specification

In column 2 at line 27; Change "with" to --width--.

In column 2 at line 53; Change "FIG. 2A." to --FIG. 2.--.

In column 3 at line 18; Change "FIG. 2A." to --FIG. 2.--.

In column 3 at line 33; Change "MOFET" to --MOSFET--.

In column 3 at line 35; Change "FIG. 2A." to --FIG. 2.--.

In column 3 at line 41; Change "MOFET" to --MOSFET--.

In column 4 at line 2; Change "(PEM)" to --(PWM)--.

In column 5 at line 58; Change "CICV" to --CCCV--.

In column 6 at line 29; Change "coupling:" to --coupling.--.

In column 6 at line 57; Change "below:" to --below.--.

In column 7 at line 14; Change "MOFETS" to --MOSFETS--.

In the Claims

In column 8 at line 22; In Claim 6, change "with" to --width--.

In column 8 at line 32 (approx.); In Claim 9, change "transmitter" to --system--.

In column 8 at line 40; In Claim 11, change "conductor" to --conductor,--.

In column 8 at line 44; In Claim 12, change "PMW" to --PWM--.

In column 9 at line 7; In Claim 22, change "each," to --each--.

Signed and Sealed this
Third Day of September, 2013

Teresa Stanek Rea
*Acting Director of the United States Patent and Trademark Office*